United States Patent [19]

Mazzarella et al.

[11] E Re. 29,960

[45] Reissued Apr. 10, 1979

[54] METHOD OF SIZING PAPER

[75] Inventors: Emil D. Mazzarella, Mountainside; Leonard J. Wood, Jr., Berkeley Heights; Walter Maliczyszyn, Somerville, all of N.J.

[73] Assignee: National Starch and Chemical Corp., Bridgewater, N.J.

[21] Appl. No.: 881,843

[22] Filed: Feb. 27, 1978

Related U.S. Patent Documents

Reissue of:

[64] Patent No.: 4,040,900
Issued: Aug. 9, 1977
Appl. No.: 683,405
Filed: May 5, 1976

U.S. Applications:

[63] Continuation-in-part of Ser. No. 535,443, Dec. 23, 1974, abandoned, which is a continuation-in-part of Ser. No. 471,230, May 20, 1974, abandoned.

[51] Int. Cl.[2] ..... D21D 3/00

[52] U.S. Cl. ..... 162/158; 162/184; 427/391

[58] Field of Search ..... 162/158, 184; 260/346.8 R, 346.3; 252/312; 427/391

[56] References Cited

U.S. PATENT DOCUMENTS

| | | | |
|---|---|---|---|
| 3,102,064 | 8/1963 | Wurzburg et al. | 162/158 |
| 3,821,069 | 6/1974 | Wurzburg | 162/158 |

OTHER PUBLICATIONS

Schwartz, "Surface Active Agents and Detergents", vol. II, p. 121.

*Primary Examiner*—S. Leon Bashore
*Assistant Examiner*—Peter Chin
*Attorney, Agent, or Firm*—James & Franklin

[57] ABSTRACT

A size mixture comprising a substituted cyclic dicarboxylic acid anhydride and polyoxyalkylene alkyl or alkylaryl ether or the corresponding mono- or di-ester is used to size paper products. In accordance with a preferred embodiment the liquid size mixture is added directly to the paper stock system without prior emulsification.

7 Claims, No Drawings

METHOD OF SIZING PAPER

Matter enclosed in heavy brackets [ ] appears in the original patent but forms no part of this reissue specification; matter printed in italics indicates the additions made by reissue.

This application is a continuation-in-part of our copending U.S. Application, Ser. No. 535,443 filed Dec. 23, 1974 which application is a continuation-in-part of U.S. application Ser. No. 471,230 filed May 20, 1974, both now abandoned.

BACKGROUND OF THE INVENTION

I. Field of the Invention

This invention relates to an improved method for the sizing of paper products. More particularly, the invention relates to an improved method for sizing paper and paperboard products under specified conditions using a mixture comprising hydrophobic substituted cyclic dicarboxylic acid anhydrides and specific polyoxyalkylene alkyl or alkyl-aryl ethers or the corresponding mono- or di-esters. The invention also has as a preferred embodiment a method for sizing paper products directly in the paper stock preparation system without the need for prior emulsification of the size agent.

As used herein, the term "paper and paperboard" includes sheet-like masses and molded products made from fibrous cellulosic materials which may be derived from both natural and synthetic sources. Also included are sheet-like masses and molded products prepared from combinations of cellulosic and non-cellulosic materials derived from synthetics such as polyamide, polyester and polyacrylic resin fibers as well as from mineral fibers such as asbestos and glass.

II. Brief Description of the Prior Art

It is recognized that paper and paperboard are often sized with various hydrophobic materials including, for example, rosin, wax emulsions, mixtures of rosin with waxes, ketene dimers, isocyanate derivatives, fatty acid complexes, fluorocarbons, certain styrene-maleic anhydride copolymers, as well as the substituted cyclic dicarboxylic acid anhydrides more particularly described hereinafter. These materials are referred to as sizes or sizing and they may be introduced during the actual paper making operation wherein the process is known as internal or engine sizing. On the other hand, they may be applied to the surface of the finished web or sheet in which case the process is known as external or surface sizing.

In order to obtain good sizing with any of the previously described sizing compounds, it is desirable that they be uniformly dispersed throughout the fiber slurry in as small a particle size as is possible to obtain. In accordance with the known methods of adding these sizing compounds to the paper stock prior to web formation, therefore, the sizing compound is added in the form of an aqueous emulsion prepared with the aid of emulsifying agents including, for example, cationic or ordinary starches, carboxymethyl cellulose, natural gums, gelatin, cationic polymers or polyvinyl alcohol, all of which act as protective colloids.

These prior art techniques which utilized emulsifying agents with or without added surfactants did, however, suffer from several inherent deficiencies in commercial practice. A primary deficiency concerned the necessity of utilizing relatively complex, expensive and heavy equipment capable of exerting high homogenizing shear and/or pressures, together with rigid procedures regarding emulsifying proportions and temperatures, etc., for producing a satisfactory stable emulsion of the particular size. Additionally, the use of many surfactants in conjunction with protective colloids was found to create operational problems in the paper making process such as severe foaming of the stock and/or loss in sizing.

With particular reference to the procedures of the prior art which utilized substituted cyclic dicarboxylic acid anhydrides as sizing agents, it has been necessary in commercial practice to pre-emulsify with cationic starch or other hydrocolloids using relatively rigid procedures with elevated temperatures to cook the starch or hydrocolloids and high shearing and/or high pressure homogenizing equipment. Unless these complicated procedures are carefully followed, the methods result in process difficulties such as deposition in the paper system, quality control problems and generally unsatisfactory performance.

Although it has been proposed to use such surfactants as polyoxyethylene sorbitan trioleate, polyoxyethylene sorbitol hexaoleate or polyoxyethylene sorbitol oleatelaurate, the use thereof as sole emulsifying agents has not proved satisfactory since it has not been possible to form a stable, small size particle emulsion and/or the emulsion did not produce sufficient sizing performance. Moreover, in some instances, the resultant emulsion detrimentally affected other properties of the size paper, for example, loss of wet strength. Another drawback noted with various emulsions prepared with certain surfactants, is demonstrated where on aging of the treated paper, many small hydrophilic spots were formed as evidenced by an ink dip test. Thus, the use of these surfactants together with the substituted cyclic dicarboxylic acid anhydrides has been limited to very minor amounts used only in conjunction with protective colloids and under rigorously controlled conditions.

There is thus a need in the art for a method for sizing paper and paperboard products which will eliminate the difficult procedures and complex high shear homogenizing equipment now required for producing an emulsion and will result in more flexibility in preparing and handling the size mixture. There is also a need for a method for producing emulsions of smaller particle size and superior functionality in the paper making process to those prepared by the methods of the prior art, the use of which will result in improved sizing performance and improved operability.

SUMMARY OF THE INVENTION

In accordance with the method of the present invention, a size mixture is prepared by combining 80–97 parts, preferably 90–95 parts, by weight, of at least one substituted cyclic dicarboxylic acid anhydride and 3–20 parts, preferably 5–10 parts, by weight, of a polyoxyalkylene alkyl or polyoxyalkylene alkyl-aryl ether or the corresponding mono- or di-ester. These size mixtures are easily emulsifiable with water in the absence of high shearing forces and under normal pressure by merely stirring, passing through a mixing valve or common aspirator or by the usual agitation present in a stock preparation system. By stating that these components are emulsified in the absence of high shearing forces is meant that the use of high shearing forces such as are present in Waring blenders, turbine pumps, or other extremely high speed agitators etc. are not required; the use of normal pressures means that such pressures as are found in piston or other types of homogenization equipment are also not required. At least one of the latter techniques was required in forming emulsions in accordance with prior art teachings. The emulsion thus produced in accordance with the process of our invention is adequately stable for commercial purposes and possesses a sufficiently small particle size to produce excellent sizing of the resultant web.

In carrying out the present invention the emulsion, formed in the absence of high shearing forces and under normal pressures, is intimately dispersed within the paper stock system prior to its passing through the drying stage of the paper making operation in an amount sufficient to provide a concentration of the substituted cyclic dicarboxylic acid anhydride of from 0.01 to 2.0% based on dry fiber weight. In accordance with the embodiments of the invention, the sizing emulsion may be formed prior to introduction into the paper stock system or the emulsion may be formed in situ within the paper stock system in the presence of good agitation at any point during preparation thereof.

In accordance with the latter and preferred embodiment, the size mixtures disclosed herein may be used in the sizing method without any prior emulsification step. In accordance with this variation, the components are premixed without water and added to the paper stock preparation system at any point during preparation where good agitation can be achieved. It has been found that the required degree of "good agitation" is achieved when passing through refiners, pumps and other operating equipment, thereby producing the emulsion in situ and excellent sizing properties in the resultant sized web.

It is a feature of the present invention that the resultant emulsions of the specific size mixtures are characterized by a smaller particle size than is generally achieved by the methods of the prior art. Additionally, the use of the size mixtures and method of the present invention result in significantly improved sizing performance (i.e. improved sizing is achieved with a given concentration of size), and also results in the improved operability as evidenced by reduced build-up of fiber and sizing agent on the press rolls of the paper machine.

It is another feature of the compositions and method of the present invention that the resultant sized paper product is characterized by reduced water and ink absorption as well as by increased resistance to aqueous acid and alkaline solutions.

DESCRIPTION OF THE PREFERRED EMBODIMENTS

The sizing compounds contemplated for use in our size mixtures are substituted cyclic dicarboxylic acid anhydrides. More specifically, the sizing compounds correspond to the following structural formulas:

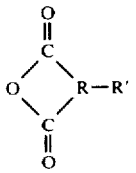

(A)

wherein R represents a dimethylene or trimethylene radical and wherein R' is a hydrophobic group containing more than 5 carbon atoms which may be selected from the class consisting of alkyl, alkenyl, aralkyl, or aralkenyl groups;

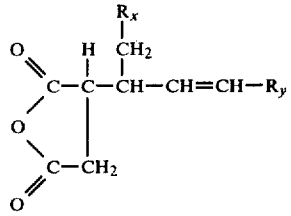

(B)

wherein $R_x$ is an alkyl radical containing at least 4 carbon atoms and $R_y$ is an alkyl radical containing at least 4 carbon atoms, and $R_x$ and $R_y$ are interchangeable; and

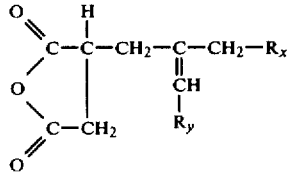

(C)

wherein $R_x$ is an alkyl radical containing at least 5 carbon atoms and $R_y$ is an alkyl radical containing at least 5 carbon atoms and $R_x$ and $R_y$ are interchangeable.

Specific examples of sizing compounds falling within structure (A) include iso-octadecenyl succinic acid anhydride, n-hexadecenyl succinic acid anhydride, dodecenyl succinic acid anhydride, dodecyl succinic acid anhydride, decenyl succinic acid anhydride, octenyl succinic acid anhydride, triisobutenyl succinic acid anhydride, etc. Sizing compounds in which R' contains more than twelve carbon atoms are preferred. The sizing compounds of structure (A) are fully described in U.S. Pat. No. 3,102,064 issued Aug. 27, 1963.

Specific examples of sizing compounds falling within structure (B) include (1-octyl-2-decenyl)-succinic acid anhydride and (1-hexyl-2-octenyl)-succinic acid anhydride. The sizing compounds of structure (B) are fully described in U.S. Pat. No. 3,821,069 assigned to the assignees of the present invention.

Specific examples of sizing compounds falling within structure (C) include those non-polymeric sizes prepared by the reaction of maleic acid anhydride with vinylidene olefins such as 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-decene and 2-n-heptyl-1-octene. The sizing compounds of structure (C) are fully described in copending application assigned to the assignees of the present invention, Ser. No. 569,816 filed Apr. 21, 1975.

The polyoxyalkylene alkyl or polyoxyalkylene alkyl-aryl ethers or corresponding mono- or di-esters useful herein comprise polyoxyethylene or polyoxypropylene alkyl and alkyl-aryl ethers or esters containing five to twenty polyoxyethylene (or polyoxypropylene) units wherein the alkyl radical contains from eight to twenty carbon atoms and the aryl radical is preferably phenyl. The specific ethers or mono- or di-esters used in the present invention are those derived from polyoxyethylene or polyoxypropylene diols in which one or both of the terminal hydroxyl groups are etherified or esterified. The generic formulae of the compounds operable in the invention are:

$$C_xH_{2x+1}-\overset{O}{\overset{\|}{C}}-O-[(CH_2)_i-CH_2-CH_2-O]_m-\overset{O}{\overset{\|}{C}}-C_nH_{2n+1} \quad \text{(i)}$$

$$HO-[(CH_2)_i-CH_2-CH_2-O]_m-\overset{O}{\overset{\|}{C}}-C_nH_{2n+1} \quad \text{(ii)}$$

$$HO-[(CH_2)_i-CH_2-CH_2-O]_m-R-C_nH_{2n+1} \quad \text{iii)}$$

$$HO-[(CH_2)_i-CH_2-CH_2-O]_m-C_nH_{2n+1} \quad \text{iv)}$$

wherein x and n are integers in the range of 8 to 20; R is an aryl radical; m is an integer in the range of 5 to 20; and i is 0 or 1.

The preparation of these materials is also known to those skilled in the art. Typical commercially available products useful in the method of this invention include Renex 690 sold by ICI America, Incorporated, Wilmington, Delaware; Triton X-100, Triton X-101, Triton X-165 and Triton N-57 sold by Rohm and Haas Company, Philadelphia, Pennsylvania; Tergitol NP-27, Tergitol NP-33 and Tergitol TMN sold by Union Carbide Corporation, New York, New York; and Igepal CO-630 sold by GAF Corporation, New York, New York as well as PEG 400 Mono-oleate supplied by Finetex, Incorporated and PEG 600 Dilaurate sold by Armak Chemical Division of Akzona, Inc.

In accordance with the method of this invention, the size mixture is formed by mixing 80 to 97 parts by weight, preferably 90 to 95 parts, of the aforementioned substituted cyclic dicarboxylic acid anhydride with 3 to 20 parts, preferably 5 to 10 parts, of the selected polyoxyalkylene alkyl or alkyl-aryl ethers or esters. The use of the latter component in excess of about 15–20 parts becomes uneconomical in terms of cost since much of the material may be wasted, while amounts in excess of about 20 parts may even be detrimental in terms of the papermaking operation.

It is to be recognized that mixtures of various combinations of substituted cyclic dicarboxylic acid anhydrides and/or polyoxyalkylene alkyl or alkyl-aryl ethers or esters may be used in preparing a particular size mixture, as long as they fall within the scope of this invention.

If pre-emulsification of the size mixture is desired, it may be readily accomplished by adding the sizing components to water in sufficient quantity so as to yield an emulsion containing the substituted cyclic dicarboxylic acid anhydride in a concentration of from about 0.1 to 20% by weight. The aqueous mixture is thereafter sufficiently emulsified merely by stirring with moderate speed agitation or by passing it through a mixing valve, aspirator or orifice so that the average particle size of the resultant emulsion will be less than about 3 microns. It is to be noted that in preparing the emulsion, it is also possible to add the components of the size mixture to the water separately, and that the emulsion may be prepared using continuous or batch methods.

Emulsification of the mixture readily occurs at ambient temperatures and no advantage is found in elevating the mixture above about 25° C. and, in fact, higher temperatures are to be avoided due to the possibility of hydrolysis of the anhydride. Thus, the emulsification will occur directly in cold water and heating of the water prior to addition of the sizing mixture is unnecessary and can even be detrimental.

As to actual use, no further dilution of the emulsion is generally necessary. The thus-prepared emulsion is simply added to the wet end of the paper making machine or to the stock preparation system so as to provide a concentration of the substituted cyclic dicarboxylic acid anhydride of from about 0.01 to about 2.0% based on dry fiber weight. Within the mentioned range, the precise amount of size which is to be used will depend for the most part upon the type of pulp which is being treated, the specific operating conditions, as well as the particular end use for which the paper product is destined. For example, paper which will require good water resistance or ink holdout will necessitate the use of a higher concentration of size than paper which will be used in applications where these properties are not critical.

In another embodiment of this invention, instead of adding the size emulsion to the stock preparation system, the size emulsion may be sprayed onto the surface of the formed web at any point prior to the drying step. In accordance with this embodiment, the emulsion is used in the concentrations as prepared and is sprayed onto the web so as to provide the required size concentration.

In accordance with a preferred embodiment of the present invention, the ingredients of the size mixture may be premixed without water and added to the paper making stock system. In this case, the substituted cyclic dicarboxylic acid anhydride will then emulsify in situ in the stock preparation system without the need for prior emulsification in water. As in the case in which the size is emulsified prior to use, the amount of size employed will vary depending on conditions, however, it will generally be within the range of about 0.01 to 2.0% substituted cyclic dicarboxylic acid anhydride based on dry fiber weight.

An important factor in the effective utilization of the size mixtures herein involves their use in conjunction with material which is either cationic or is capable of ionizing or dissociating in such a manner as to produce one or more cations or other positively charged moieties. These cationic agents, as they hereinafter will be referred to, have been found useful as a means for aiding the retention of the substituted cyclic dicarboxylic acid anhydride as well as for bringing the latter into close proximity to the pulp fibers. Among the materials which may be employed as cationic agents in the method of this invention, one may list long chain fatty amines, amine-containing synthetic polymers (primary, secondary, tertiary or quaternary amine), substituted polyacrylamide, animal glue, cationic thermosetting resins and polyamide-epichlorohydrin polymers. Of particular use as cationic agents are various cationic starch derivatives including primary, secondary, tertiary or quaternary amine starch derivatives and other cationic nitrogen substituted starch derivatives, as well as cationic sulfonium and phosphonium starch derivatives. Such derivatives may be prepared from all types of starches including corn, tapioca, potato, waxy maize, wheat and rice. Moreover, they may be in their original granule form or they may be [converted] *converted* to pregelatinized, cold water soluble products.

Any of the above noted cationic retention agents may be added to the stock, i.e. the pulp slurry, either prior to, along with or after the addition of the size mixture or size emulsion.

With respect to the amount of cationic retention agent necessary, under ordinary circumstances, the cationic agent is added to the stock system in an amount of at least about 0.01%, preferably 0.025 to 3.0%, based on dry fiber weight. While amounts in excess of about 3% may be used, the benefits of using increased amounts of retention aid for sizing purposes are usually not economically justified.

Subsequent to the addition of the size emulsion and retention aid, the web is formed and dried on the paper making machine in the usual manner. While full sizing is generally achieved immediately off the paper machine, further improvements in the water resistance of the paper prepared with the size mixtures of this invention may at times be obtained by curing the resulting webs, sheets or molded products. This curing process generally involves heating the paper at temperatures in the range of from 80° to 150° C. for a period of from 1 to 60 minutes. It is to be noted that this post-curing is not essential to the successful operation of the improved sizing method described herein.

The size mixtures of the present invention may be successfully utilized for the sizing of paper prepared from all types of both cellulosic and combinations of cellosic with non-cellulosic fibers. The hardwood or softwood cellulosic fibers which may be used include bleached and unbleached sulfate (Kraft), bleached and unbleached sulfite, bleached and unbleached soda, neutral sulfite semi-chemical, groundwood, chemi-groundwood, and any combination of these fibers. These designations refer to wood pulp fibers which have been prepared by means of a variety of processes which are used in the pulp and paper industry. In addition, synthetic cellulosic fibers of the viscose rayon or regenerated cellulose type can also be used, as well as recycled waste papers from various sources.

All types of pigments and fillers may be added in the usual manner to the paper product which is to be sized. Such materials include clay, talc, titanium dioxide, calcium carbonate, calcium sulfate and diatomaceous earths. Stock additives such as defoamers, pitch dispersants, slimicides, etc. as well as other sizing compounds can also be used with the size mixtures described herein.

The use of the size mixtures described herein in accordance with the method of this invention has been found (as will be illustrated by the examples which follow) to yield paper products having improved size properties, for example, resistance to water or acidic ink solutions. In other words, a specified degree of size properties in paper products can be achieved with a smaller amount of size when the size composition is utilized in accordance with the method of this invention rather than by methods known in the prior art.

Moreover, it is a further advantage that use of the size mixtures herein is not limited to any particular pH range which thus allows for their utilization in the treatment of neutral and alkaline pulp, as well as acidic pulp. The size mixtures may thus be used in combination with alum, which is very commonly used in making paper, as well as other acid materials. Conversely, they may also be used with calcium carbonate or other alkaline materials in the stock. A further advantage of these size mixtures is that they do not detract significantly from the strength of the paper in the normal concentrations employed in the industry and when used with certain adjuncts will, in fact, increase the strength of the finished sheets. An additional advantage found in the use of these size mixtures is that only drying or mild curing conditions are required to develop full sizing value.

The following examples will further illustrate the embodiments of the present invention. In these examples, all parts given are by weight unless otherwise specified.

EXAMPLE I

This example illustrates the use of a size mixture representative of the size mixtures of this invention utilized in the form of an aqueous emulsion. This emulsion is compared, in terms of particale size and water resistance of the resulting sized paper, with a conventional emulsion wherein substituted cyclic dicarboxylic acid anhydride is emulsified with cationic starch. A further comparison is made with a rosin/alum sizing method as commonly employed in the paper industry. The much greater ease of emulsification of the size mixtures of this invention is also demonstrated by the procedure used in preparing the sizing emulsions prior to their addition to the paper stock system. The ability to size paper effectively with or without alum in the stock is also shown.

The size mixture was prepared by combining (A) 10 parts of a polyoxyalkylene alkyl-aryl ether wherein the alkyl group contained 9 carbon atoms, the aryl radical was phenyl and the polyoxyalkylene moiety was formed with 10 moles of ethylene oxide (Renex 690) and (B) 90 parts of substituted cyclic dicarboxylic acid anhydride wherein the alkenyl groups of the mixed anhydrides contained 15 to 20 carbon atoms (hereinafter referred to as ASA). Other materials equivalent to Renex 690 include Triton N-101 and Igepal CO-630. An emulsion was then formed by agitating 2 parts of this mixture with 98 parts of water using a propeller-type mixer at moderate speed (500 rpm) for 10 seconds (Emulsion No. 1). A similar emulsion was also formed by passing this size mixture through a simple aspirator, together with a constant stream of water, to yield 1% concentration of size mixture in one pass. The aspirator had a throat dimeter of 0.15 in. and the flow rate employed was 14 liters per minute. The emulsion was thus formed almost instantaneously (Emulsion No. 2).

For comparison, a conventional aqueous emulsion of ASA was prepared by first cooking 10 parts of the beta-diethyl aminoethyl chloride hydrochloride ether of corn starch, whose preparation is described in Example I of U.S. Pat. No. 2,813,093, in 90 parts of water which was heated in a boiling water bath. The dispersion of the cationic starch derivative, after being cooked for 20 minutes, was cooled to room temperature and transferred to a Cenco cup attachment No. 17246-2 on a Waring blender whereupon 5 parts of ASA were slowly added to the agitated dispersion. Agitation was continued for about 3 minutes at 23,000 rpm and the resulting emulsion was then diluted by the addition of water to equal a total of 1,000 parts, 0.5% solids (Emulsion No. 3).

Calculated amounts of the emulsions prepared as described above were added to aqueous slurries of bleached sulfate pulp having a Williams freeness of 400, a consistency of 0.5% and a pH of about 7.6, so as to yield the following concentrations of ASA on dry fiber weight: 0.10, 0.20 and 0.40%. The cationic starch used in making Emulsion No. 3 was added to the respective pulp slurry subsequent to the addition of Emulsions No. 1 and No. 2 in a concentration of 0.4% on dry fiber weight to retain these materials in the sheet. In another variation of this procedure, 4% alum, based on dry fiber weight, was added to the pulp slurry before addition of the sizing emulsions. Sheets were formed in accordance with TAPPI standards, dryed on a rotary print drier (surface temperature approx. 90° C.) then cured for 1 hour at 105° C. and conditioned overnight at 72° F. and 50% R.H. before testing. The basis weight of these sheets was 55 lbs./ream (24×36 inch - 500 sheets).

In comparing the water resistance of these sheets, use was made of a dye test employing crystals of potassium permanganate and an acid ink penetration test. In the dye test several crystals of potassium permanganate are placed on the upper surface of a swatch of test paper which is then set afloat in distilled water at room temperature. As the water is absorbed into the paper the crystals are moistened and impart a characteristic deep violet color to the paper. The time measured in seconds required for an end-point where three colored spots first appear on the paper surface is noted and is in direct relation to the water resistance since a more water resistant paper will retard the moistening of the permanganate crystals which has been placed upon its upper surface.

The acid ink penetration test is a comparison test wherein a swatch of test paper is floated in a dish of acid ink (pH 1.5) at 100° F. and the time measured in seconds required for the ink to penetrate through the paper to reach an end-point where about 50% of the paper is colored is noted.

The following table presents data on the various paper sheets which were compared in the described testing procedures.

TABLE 1

| Sheet No. | Sizing Emulsion | Average Particle Size of Emulsion (Microns) | % by Weight of Dry Pulp | Alum Addition | Acid ink Penetration (Time in Seconds) | $KMnO_4$ (Time in Seconds) |
|---|---|---|---|---|---|---|
| 1. | Emulsion #1 | <1 | 0.1 | None | 25 | 53 |
| 2. | Emulsion #1 | <1 | 0.2 | " | 275 | 72 |
| 3. | Emulsion #1 | <1 | 0.4 | " | 430 | 77 |
| 4. | Emulsion #2 | <1 | 0.1 | " | 70 | 53 |
| 5. | Emulsion #2 | <1 | 0.2 | " | 140 | 74 |
| 6. | Emulsion #2 | 1 | 0.4 | " | 320 | 87 |
| 7. | Emulsion #3 (Control) | 2-3 | 0.1 | " | 12 | 54 |
| 8. | Emulsion #3 (Control) | 2-3 | 0.2 | " | 40 | 67 |
| 9. | Emulsion #3 (Control) | 2-3 | 0.4 | " | 65 | 75 |
| 10. | Emulsion #1 | <1 | 0.1 | 4% | 100 | 58 |
| 11. | Emulsion #1 | <1 | 0.2 | 4% | 145 | 70 |
| 12. | Emulsion #1 | <1 | 0.4 | 4% | 190 | 87 |
| 13. | Emulsion #2 | <1 | 0.1 | 4% | 110 | 57 |
| 14. | Emulsion #2 | <1 | 0.2 | 4% | 150 | 68 |
| 15. | Emulsion #2 | <1 | 0.4 | 4% | 205 | 88 |
| 16. | Emulsion #3 (Control) | 2-3 | 0.1 | 4% | 90 | 65 |
| 17. | Emulsion #3 (Control) | 2-3 | 0.2 | 4% | 130 | 73 |
| 18. | Emulsion #3 | 2-3 | 0.4 | 4% | 170 | 84 |
| 19. | Rosin (Control) | — | 1.0 | 4% | 55 | 67 |
| 20. | Blank | — | None | None | 0 | 0 |

The above data clearly shows the greater ease of preparation and superiority of the size mixtures of this invention, both in terms of the small particle size of emulsions formed with these compositions and in terms of water resistance imparted to the sized paper over a range in level of addition typically employed in the industry. It is also clear that these compositions demonstrate superior sizing both in near-neutral and alum-containing (acidic) stock systems.

EXAMPLE II

This example illustrates the use of size mixtures of this invention wherein various substituted cyclic dicarboxylic acid anhydrides are utilized in mixtures with polyoxyalkylene alkyl and alkyl-aryl ethers.

In this example, the polyoxyalkylene alkyl-aryl ether was the same material described in Example I and was mixed in a ratio of 20 parts with 80 parts of the anhydride. The substituted cyclic dicarboxylic acid anhydrides incorporated in the mixtures of this example were then varied as follows: Mixture No. 1 - the ASA described in Example I; Mixture No. 2 - iso-octadecenyl succinic acid anhydride; Mixture No. 3 - hexapropylene succinic acid anhydride; Mixture No. 4 - (1-octyl-2-decenyl)-succinic acid anhydride, i.e. the reaction product of maleic anhydride and octadecene-9. Emulsions of these mixtures were prepared in the same manner used to prepare Emulsion No. 1 described in Example I.

Calculated amounts of the emulsions were added to separate aqueous slurries of bleached sulfate pulp having a freeness of 400, a consistency of 0.5% and a pH of about 7.6. The cationic starch of Example I was also added to the separate pulp slurries. Sheets were formed and dried in accordance to TAPPI standards and thereafter conditioned and tested as described in Example I. The basis weight of these sheets was 55 lbs./ream (24×36 inches - 500 sheets). All additions were made at a concentration of 0.2% substituted cyclic dicarboxylic acid anhydride and 0.4% cationic starch by weight of dry pulp. Following were the results obtained:

TABLE 2

| Size Mixture No. | Average Particle Size of Emulsion (Microns) | Acid Ink Penetration (Time in Seconds) | $KMnO_4$ (Time in Seconds) |
|---|---|---|---|
| 1 | <1 | 225 | 73 |
| 2 | 1-2 | 100 | 40 |
| 3 | <1 | 240 | 81 |
| 4 | <1 | 600 | 86 |

Similar superior emulsions and sizing are obtainable employing the polyoxyalkylene alkyl-aryl ether of Example I together with the reaction product of maleic acid anhydride and 2-n-octyl-1-decene.

This example clearly shows that various substituted cyclic dicarboxylic acid anhydrides may be used to prepare size mixtures within the scope of this invention. Additionally mixtures or blends of the anhydrides herein described may be employed and will produce comparable sizing.

EXAMPLE III

This example illustrates the use of size mixtures of this invention wherein different polyoxyalkylene alkyl or alkyl-aryl ether or the corresponding mono- or diester compounds are utilized in the mixture with substituted cyclic dicarboxylic acid anhydride.

In this example, the substituted cyclic dicarboxylic acid anhydride was the same material (ASA) described in Example I while the polyoxyalkylene alkyl and alkyl-aryl ether or ester compounds used in the size mixtures were varied. Size mixtures used in this example were prepared as follows: Mixture No. 1 - 5 parts of the polyoxyalkylene alkyl-aryl ether described in Example I were mixed with 95 parts ASA; Mixture No. 2 - 15 parts of the polyoxyalkylene alkyl-aryl ether described in Example I were mixed with 85 parts ASA; Mixture No. 3 - 10 parts of a polyoxyalkylene alkyl-aryl ether wherein the alkyl group contains 9 carbon atoms, the aryl radical is phenyl and the polyoxyalkylene moiety was formed with 5 moles of ethylene oxide (Triton N-57) were mixed with 90 parts of ASA; Mixture No. 4 - 10 parts of a polyoxyalkylene alkyl ether wherein the alkyl group contains 12 carbon atoms and the polyoxyalkylene moiety was formed with 6 moles of ethylene oxide (Tergitol TMN) were mixed with 90 parts ASA; Mixture No. 5 - 10 parts of a polyoxyalkylene alkyl-aryl ether wherein the alkyl group contained 9 carbon atoms, the aryl radical was phenyl and the polyoxyalkylene moiety was formed with 15 moles of ethylene oxide (Tergitol NP-33) were mixed with 90 parts ASA; Mixture No. 6 - 10 parts of a polyoxyethylene monooleate ester wherein the molecular weight of the polyoxyethylene moiety was 400 (PEG 400 Monooleate) were mixed with 90 parts of ASA; and Mixture No. 7 - 10 parts of polyoxyethylene dilaurate ester wherein the molecular weight of the polyoxyethylene moiety was 600 (PEG 600 Dilaurate) were mixed with 90 parts of ASA. Each of these mixtures was then agitated in water to yield emulsions containing 2 parts size mixture and 98 parts of water. The emulsions were then added to a 0.5% consistency pulp slurry containing bleached sulfate pulp beaten to a freeness of 400 and at a pH of approximately 7.6 to yield 0.2% ASA on weight of dry fiber. The cationic starch described in Example I was then added to the pulp to yield 0.4% cationic starch on weight of dry pulp. Handsheets thereafter were formed, contitioned and tested in the dye test as described in Example I. Following were the results obtained.

TABLE 3

| Size Mixture No | Average Particle Size of Emulsion (Microns) | $KMnO_4$ (Time in Seconds) |
|---|---|---|
| 1 | 1-2 | 98 |
| 2 | <1 | 93 |
| 3 | <1 | 104 |
| 4 | Approx. 1 | 99 |
| 5 | Approx. 1 | 96 |

TABLE 3-continued

| Size Mixture No | Average Particle Size of Emulsion (Microns) | $KMnO_4$ (Time in Seconds) |
|---|---|---|
| 6 | Approx. 1 | 76 |
| 7 | Approx. 1 | 86 |

This example clearly shows that various polyoxyethylene alkyl and alkyl-aryl ethers and the corresponding mono- and di-esters, within the scope of this invention, can be used interchangeably in size mixtures with substituted cyclic dicarboxylic acid anhydrides to yield excellent sizing performance.

EXAMPLE IV

This example illustrates the use of our size mixtures by direct addition to a papermaking stock system in unemulsified form.

Size Mixture No. 1 prepared from 90 parts ASA (described in Example I) and 10 parts of polyoxyalkylene alkyl-aryl ether (described in Example I) was added directly to a slurry of bleached sulfate pulp at 1.5% consistency in a laboratory Valley beater and beaten very lightly for a few minutes. Similarly, Size Mixtures No. 2 and No. 3 were prepared from 90 parts ASA and 10 parts PEG 400 Monooleate or 10 parts PEG 600 Dilaurate, respectively, and these mixtures were also added directly to the slurry. The pulp was then diluted to 0.5% consistency, and 0.4% on dry fiber weight of the cationic starch described in Example I was added separately to the slurry to act as a retention aid during sheet formation. Sheets were then formed, conditioned and tested in the dye test as described in Example I. The basis weight of these sheets was 55 lbs./ream (24×36 inches - 500 sheets). Following are the results obtained.

TABLE 4

| Size Mixture No. | % ASA by Weight on Dry Pulp | $KMnO_4$ (Time in Seconds) |
|---|---|---|
| 1 | 0.2 | 75 |
| 2 | 0.2 | 40 |
| 3 | 0.2 | 39 |
| Blank | None | 0 |

The self-emulsifying properties of these size mixtures are demonstrated by the excellent sizing value achieved when they are added to the stock without prior emulsification in water. Consequently, the considerable ease *and* versatility in the use of the size [mixutres] *mixtures* of this invention can be readily seen.

EXAMPLE V

This example illustrates the ability of size mixtures of this invention to readily size paper containing high levels of inorganic filler. In this example, the size mixture used was the same as described in Example I. Prior to additon, the size mixture was emulsified (Emulsion A) in the same manner as described for the preparation of Emulsion No. 2 in Example I. For comparison purposes, a conventional sizing emulsion (Emulsion B) was prepared in accordance with the method described to prepare Emulsion No. 3 in Example I. Each emulsion was then added to 1) a 0.5% consistency stock slurry containing bleached sulfate pulp with 20% Kaolin clay and 4% alum on dry fiber weight; and 2) a 0.5% consistency stock slurry containing bleached sulfate pulp with 20% calcium carbonate on dry fiber weight. The pH of the calcium carbonate-containing stock slurry was approximately 8.5, while the pH of the clay-containing slurry was approximately 5.5. Each emulsion was added to the stock at a level to yield 0.4% ASA on dry fiber weight. For retention purposes, 0.8% of the cationic starch described in Example I was added to the pulp slurry following addition of Emulsion A. Sheets of 55 lbs./ream (24×36 inches - 500 sheets) basis weight were then formed and conditioned in the manner described in Example I and tested accordingly. Following are the results obtained:

TABLE 5

| Sheet No. | Size Added | Filler Added | Acid Ink Penetration (Time in Secs.) | $KMnO_4$ (Time in Secs.) |
|---|---|---|---|---|
| 1 | Emulsion A | 20% Clay | 115 | 75 |
| 2 | Emulsion A | 20% $CaCO_3$ | 450 | 68 |
| 3 | Emulsion B (Control) | 20% Clay | 100 | 70 |
| 4 | Emulsion B (Control) | 20% $CaCO_3$ | 325 | 56 |
| 5 | Blank | 20% Clay | 0 | 0 |

The above data clearly shows the improved sizing achieved with the size mixtures of this invention in highly filled sheets and under both acid and alkaline stock conditions.

EXAMPLE VI

This example illustrates the use of a size mixture representative of the size mixtures of this invention to size paper made with different types of pulps.

In this example, the size mixture used was the same as described in Example I and was emulsified in the same manner as described for the preparation of Emulsion No. 2 in Example I. The emulsion was then added to various pulp slurries prepared at 0.5% consistency, a freeness of 400 and pH of approximately 7.6 in amounts to yield 0.2% ASA on dry fiber weight. In all cases, 0.4% on dry fiber weight of the cationic starch described in Example I was added to the pulp slurries separately to retain the size mixture during sheet formation. Sheets of 55 lbs. ream (24×36 inches - 500 sheets) basis weight were then formed from each pulp slurry conditioned and tested in the dye test in the manner described in Example I. Following are the results obtained:

TABLE 6

| Sheet No. | Type of Pulp | $KMnO_4$ (Time in Seconds) |
|---|---|---|
| 1 | Bleached Hardwood Sulfate | 69 |
| 2 | Bleached Softwood Sulfite | 83 |
| 3 | Unbleached Softwood Sulfate | 76 |
| 4 | Groundwood | 58 |

The above data, together with data in other examples, clearly shows that the size mixtures of this invention can be effectively used to size various types of pulps commonly used in the manufacture of paper.

EXAMPLE VII

This example illustrates the use of various types of cationic agents in conjunction with the size mixtures of this invention. In this example, the size mixture used was the same as described in Example I and was emulsified, prior to the addition to the pulp slurry, in the same manner described for the preparation of Emulsion No. 2 in Example I. The emulsion was added to portions of a 0.5% consistency pulp slurry containing bleached sulfate pulp beaten to a freeness of 400. Subsequent to the addition of size emulsion, different cationic agents were added to separate slurries in order to retain the size emulsion in the web during sheet formation. An amount of size emulsion was added so as to yield 0.2% ASA on dry fiber weight in each case, while the amount of cationic agent was varied. Sheets of 55 lbs./ream (24×36 inches - 500 sheets) basis weight were then formed from each slurry, conditioned and tested in the manner described in Example I. Following are the results obtained:

TABLE 7

| Sheet No. | Cationic Agent | % on Dry Fiber Weight | Acid Ink Penetration (Time in Seconds) | $KMnO_4$ (Time in Seconds) |
|---|---|---|---|---|
| 1 | Cationic corn starch | 0.4 | 135 | 72 |
| 2 | Polyaminoethyl acrylate resin | 0.2 | 600 | 76 |
| 3 | Polyamide-amine resin | 0.2 | 600 | 85 |
| 4 | Polyethylene imine resin | 0.2 | 85 | 50 |
| 5 | Polyacrylamide-amine resin | 0.2 | 30 | 68 |
| 6 | Cationic potato starch | 0.4 | 120 | 70 |
| 7 | Alum | 4.0 | 65 | 77 |
| 8 | None (Control) | — | 0 | 0 |

The above data clearly shows that various cationic agents can be effectively employed to retain the size mixtures of this invention in the web during the sheet forming stage.

EXAMPLE VIII

This example illustrates the improved operability of these size mixtures when used on an actual papermaking machine. More specifically this example illustrates the elimination of buildup and picking tendencies created by sizing agents on the wet press rolls of a paper machine. This buildup of fiber on the wet press rolls causes disruption of the sheet surface and, in severe cases, will actually tear the sheet causing the traveling web to break at that point. Sizing was measured in this example by means of a Cobb test run on the top side of the sheet in accordance with TAPPI Standard Method T441 os-69. This test measures the amount of water absorbed by the sheet surface in a specified period of time (in this case, 2 minutes) and is expressed in terms of grams per sq. meter. Thus, lower values represent greater [wate] *water* resistance and better sizing.

A series of tests were conducted on a Fourdrinier paper machine wherein the press section consisted of two main presses followed by a smoothing press, each press consisting of a top and bottom roll. The first press consisted of a straight-through plain press with a standard rubber covered top roll as commonly used in the industry and the second press was a plain reversing press with a composition (Microrok) covered top roll, also commonly used in the industry. The smoothing press consisted of a straight-through set of rolls with a metal surfaced (Press-Tex) top roll and composition-covered (Micromate) bottom roll. The basic papermaking furnish consisted of a very lightly refined mixture of approximately 80% bleached hardwood kraft pulp and 20% bleached softwood kraft pulp. The sizing agents were added continuously to the stock preparation system and a sheet of paperboard was formed at approximately 123 lbs. per 3,000 sq. ft. basis weight. Buildup on the press rolls due to picking was ascertained under the indicated conditions on each of the press rolls and noted in descriptive terms: None, slight, moderate, heavy, etc.

Sizing emulsions were prepared as follows: Emulsion A (a control) was prepared by cooking the cationic starch described in Example I at 5% solids at 200° F. for 30 minutes. The cooked starch solution was then cooled to 130° F. and mixed with the substituted cyclic dicarboxylic acid anhydride of Example I (ASA) and emulsified by passing through commercial homogenizing equipment at 300 p.s.i. g. Emulsion B, representing an embodiment of this invention, was prepared by continuously premixing through a static mixer 90 parts of ASA with 10 parts polyoxyalkylene alkyl-aryl ether (as described in Example I), then passing this size mixture through an orifice with a continuous stream of water to yield an emulsion containing 2 parts of size mixture in 98 parts of water. For retention purposes, 0.35% cationic starch on weight of dry fiber was added subsequent to the addition of Emulsion B. Five pounds of alum per ton of stock were added to adjust stock pH to approximately 5.5 when Emulsion A and B were used. For further comparison, rosin was also used as a sizing agent in these tests. Following are the results obtained:

TABLE 8

| Addition to Stock | Buildup Noted After Running 15 Min. 1st Press | 2nd Press | Smoothing Press | Cobb Sizing ($GM/M^2$) |
|---|---|---|---|---|
| 1. Base Sheet - No Additives | None | None | Slight | 402 |
| 2. 1% Rosin + 2% Alum (Control) | Moderate | Moderate | Moderate | 34 |
| 3. 0.25% Emulsion A (Control) | Heavy | Moderate | Heavy | 32 |
| 4. 0.25% Emulsion B | None | None | Slight | 29 |

The concentrations of the various ingredients listed in the above table are expressed in terms of percent active ingredient by weight of dry pulp.

The above results clearly illustrate the improved machine operability and excellent water holdout imparted by the size mixtures of this invention when compared to conventional sizing methods employed in the industry.

EXAMPLE IX

This example illustrates the excellent resistance to acidic and alkaline solutions which is displayed by the paper which has been prepared with our novel size mixtures.

An aqueous emulsion prepared with the same size mixture and in the same manner used to prepare Emulsion No. 2 in Example I was added to a bleached sulfate pulp slurry having a freeness of 400 and a consistency 0.5%. The cationic starch of Example I was then added to the stock as a retention aid for the size. Sheets containing 0.4% ASA and 0.8% cationic starch were formed and conditioned as described in Example I. The sheets were tested by means of a modified potassium permanganate test wherein solutions of 10% lactic acid in one case and 10% sodium hydroxide in another case were used as the test fluid, along with distilled water as a control. For a further comparison, sheets were formed and tested in the same manner wherein 1% rosin and 4% alum on dry fiber weight was added to the stock for sizing in place of our size mixture. Following are the results obtained:

TABLE 9

| Sheet No. | Additive | $KMnO_4$ Penetration Time (Seconds) Distilled Water | Lactic Acid | Sodium Hydroxide |
|---|---|---|---|---|
| | 0.4% ASA Mixture | 111 | 95 | 65 |
| 2 | 1.0% Rosin/4% Alum | 70 | 60 | 25 |

This example clearly shows the excellent resistance imparted by these size mixtures to penetration by both acidic and alkaline fluids.

EXAMPLE X

This example illustrates the criticality of the molecular structure of the polyoxyethylene alkyl and alkyl-aryl ethers on the performance of these materials in the mixtures of the present invention.

The procedure and equipment used to produce Emulsion No. 2 in Example I were employed in an attempt to produce emulsions using the following surfactants of the same type which differ only in the length of the alkyl chain and in the number of moles of ethylene oxide.

The results are shown in Table 10.

TABLE 10

| Alkyl Chain | Aryl Group | Moles Ethyleneoxide | Quality of Emulsion | Avg. Particle Size |
|---|---|---|---|---|
| octyl | phenyl | 3 | very poor stability | 8μ |
| nonyl | phenyl | 5 | good stability | 1μ |
| tri-methyl nonyl | none | 6 | good stability | 1μ |
| nonyl | phenyl | 7 | good stability | 1μ |
| octyl | phenyl | 9–10 | good stability | 1μ |
| nonyl | phenyl | 6 | very good stability | 1μ |
| nonyl | phenyl | 15 | good stability | 1μ |
| octyl | phenyl | 16 | good stability | 1μ |
| octyl | phenyl | 20 | good stability | 1μ |
| octyl | phenyl | 30 | very poor stability | 8μ |
| nonyl | phenyl | 5 } blend of 50% of each | very good stability | 1μ |
| octyl | phenyl | 9–10 | | |

The above results show the necessity for employing polyoxyalkylene alkyl or alkyl-aryl ethers containing 5 to 20 ethyleneoxide units in order to produce the self-emulsifying size mixtures of the present invention.

EXAMPLE XI

In order to show the necessity for employing only the specific polyoxyalkylene alkyl or alkyl-aryl ethers or esters described herein, the procedure used to prepare Emulsion No. 1 in Example I was repeated using 10 parts of each of a variety of nonionic surfactants with 90 parts of alkenyl succinic anhydride.

In Sample 1, the surfactant employed was polyoxyethylene sorbitan trioleate (Tween 85). The resulting emulsion was so poor that it could not even be tested for sizing properties.

In Sample 2, polyoxyethylene sorbitol hexaoleate (Atlox 1086) was used as surfactant. In this sample, an emulsion could not even be produced using the procedures of applicants' Example I.

In Sample 3, polyoxyethylene sorbitol laurate (Atlox 1045) was employed. A relatively poor emulsion was formed (particle size up to 5 microns) and tested for sizing in accordance with the method of Example I. The sheets thus produced developed pin holes where water or ink penetrated instantaneously and thus were completed unacceptable in quality.

The above results show that the surfactants conventionally employed in paper sizing systems cannot be employed with the succinic anhydrides in the paper stock system without the need for either rigid emulsification procedures including extremely high shear and high pressure homogenization together with protective colloids.

In summary, the invention is seen to provide the practitioner with a size mixture useful in the manufacture of sized paper products. The size mixture is easily emulsified and the emulsion or size mixture per se may be utilized under a wide variety of paper making conditions to provide sized paper products characterized by their reduced water and ink absorption as well as their increased resistance to aqueous acid and alkaline solutions at low levels of addition. Variations may be made in proportions, procedures and materials without departing from the scope of this invention.

What is claimed is:

1. A method for sizing paper products comprising the steps of 1. providing a paper stock system;
2. forming, in the absence of high shearing forces and under normal pressures, a sizing emulsion consisting essentially of:
   a. from 80 to 97 parts of substituted cyclic dicarboxylic acid anhydride corresponding to the formula

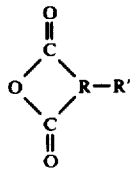

(A)

wherein R represents a dimethylene or trimethylene radical and wherein R' is a hydrophobic group containing more than 5 carbon atoms which may be selected from the class consisting of alkyl, alkenyl, aralkyl, or aralkenyl groups;

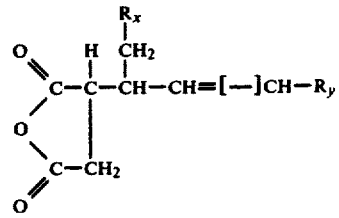

(B)

wherein $R_x$ is an alkyl radical containing at least 4 carbon atoms and $R_y$ is an alkyl radical containing at least 4 carbon atoms, and $R_x$ and $R_y$ are interchangeable;

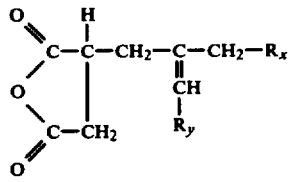

wherein $R_x$ is an alkyl radical containing at least 5 carbon atoms and $R_y$ is an alkyl radical containing at least 5 carbon atoms and $R_x$ and $R_y$ are interchangeable;

b. from 3 to 20 parts of a polyoxyalkylene alkyl or polyoxyalkylene alkyl-aryl ether or the corresponding mono- or diester selected from the group consisting of:

$$C_xH_{2x+1}-\overset{O}{\overset{\|}{C}}-O-[(CH_2)_i-CH_2-CH_2-O]_m-\overset{O}{\overset{\|}{C}}-C_nH_{2n+1} \quad \text{(i)}$$

$$HO-[(CH_2)_i-CH_2-CH_2-O]_m-\overset{O}{\overset{\|}{C}}-C_nH_{2n+1} \quad \text{(ii)}$$

$$HO-[(CH_2)_i-CH_2-CH_2O]_m-R-C_nH_{2n+1} \quad \text{(iii)}$$

$$HO-[(CH_2)_i-CH_2-CH_2-O]_m-C_nH_{2n+1} \quad \text{(iv)}$$

wherein x and n are integers in the range of 8 to 20; R is an aryl radical; m is an integer in the range of 5 to 20; and i is 0 or 1; and c. *Water;*
3. forming a web from the paper stock system [change c. water];
4. intimately dispersing said emulsion within the paper stock either before or after formation of said web but prior to passing said web through the drying stage of the paper making operation in an amount sufficient to provide a concentration of the substituted cyclic dicarboxylic acid anhydride of from 0.1 to 2.0%, based on dry fiber weight.

2. The method of claim [2] *1* wherein the sizing emulsion is formed in situ within the paper stock system.

3. The method of claim 1 wherein the sizing emulsion is formed prior to introduction into the paper stock system.

4. The method of claim 3 wherein the size mixture is emulsified with water in a sufficient quantity to yield an emulsion containing the substituted cyclic dicarboxylic acid anhydride in a concentration of from 0.1 to 20%, by weight of the total emulsified size mixture, prior to addition to the paper stock system.

5. The method of claim 3 wherein the size mixture in the form of an aqueous emulsion is sprayed onto the formed web prior to the drying operation.

6. The method of claim 1 wherein there is dispersed within the paper stock prior to the conversion of the paper stock into a dry web at least 0.01%, based on dry fiber weight, of a cationic retention agent.

7. The method of claim 1 wherein the sizing emulsion is formed with a polyoxyalkylene alkyl-phenyl ether selected from the group consisting of:

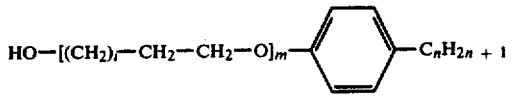

wherein n is an integer in the range of 8 to 20; m is an integer in the range of 5 to 20; and i is 0 or 1.

* * * * *

UNITED STATES PATENT OFFICE

CERTIFICATE OF CORRECTION

Patent No. Re. 29,960 Dated April 10, 1979

Inventor(s) Emil D. Mazzarella, Leonard J. Wood, Jr. and Walter Maliczyszyn

It is certified that error appears in the above-identified patent and that said Letters Patent are hereby corrected as shown below:

In Column 5, lines 3-8 and Column 18, lines 33-37, $$\text{"}C_xH_{2x+1}-\overset{O}{\overset{\|}{C}}-O-[(CH_2)_i-CH_2-CH_2-O]_m-\overset{O}{\overset{\|}{C}}-C_nH_{2n+1} \qquad \text{(i)}$$

$$HO-[(CH_2)_i-CH_2-CH_2-O]_m-\overset{O}{\overset{\|}{C}}-C_nH_{2n+1} \qquad \text{(ii)}\ \text{"}$$

should read $$\text{-- } C_xH_{2x\pm1}-\overset{O}{\overset{\|}{C}}-O-[(CH_2)_i-CH_2-CH_2-O]_m-\overset{O}{\overset{\|}{C}}-C_nH_{2n\pm1} \qquad \text{(i)}$$

UNITED STATES PATENT OFFICE

CERTIFICATE OF CORRECTION

Patent No. Re. 29,960 Dated April 10, 1979

Inventor(s) Emil D. Mazzarella, Leonard J. Wood, Jr. and Walter Maliczyszyn

It is certified that error appears in the above-identified patent and that said Letters Patent are hereby corrected as shown below:

(ii)

$$HO-[(CH_2)_i-CH_2-CH_2-O]_m-\overset{O}{\overset{\|}{C}}-C_nH_{2n\pm1}$$ --.

Signed and Sealed this

Twenty-second Day of April 1980

[SEAL]

Attest:

SIDNEY A. DIAMOND

Attesting Officer

Commissioner of Patents and Trademarks